United States Patent [19]

Carreno

[11] Patent Number: 4,477,226
[45] Date of Patent: Oct. 16, 1984

[54] BALANCE FOR ROTATING MEMBER

[75] Inventor: Diether E. Carreno, Schenectady, N.Y.

[73] Assignee: General Electric Company, Schenectady, N.Y.

[21] Appl. No.: 492,739

[22] Filed: May 9, 1983

[51] Int. Cl.³ ............................ F01D 5/10; F01D 5/32
[52] U.S. Cl. ................. 416/144; 416/220 R; 416/500
[58] Field of Search .............. 416/144, 145, 220 R, 416/500

[56] References Cited

U.S. PATENT DOCUMENTS

| | | | |
|---|---|---|---|
| 1,360,936 | 11/1920 | Guy | 416/144 X |
| 2,613,058 | 10/1952 | Atkinson | 416/144 X |
| 2,843,356 | 7/1958 | Hull | 416/144 |
| 3,181,835 | 5/1965 | Davis | 416/220 X |
| 3,297,302 | 1/1967 | Spears | 416/144 |
| 3,395,891 | 8/1968 | Burge et al. | 416/196 X |
| 3,632,228 | 1/1972 | Acres | 416/220 |
| 3,736,811 | 6/1973 | Neary | 416/144 X |
| 3,888,601 | 6/1975 | Glassburn | 416/144 |
| 3,986,779 | 10/1976 | Beckershoff | 416/220 R X |

FOREIGN PATENT DOCUMENTS

| | | | |
|---|---|---|---|
| 57408 | 5/1977 | Japan | 416/144 |
| 805371 | 12/1958 | United Kingdom | 416/144 |
| 129431 | 8/1950 | U.S.S.R. | 416/144 |

Primary Examiner—Everette A. Powell, Jr.
Attorney, Agent, or Firm—J. C. Squillaro

[57] ABSTRACT

Dovetail spacers containing slots enable final balancing of a turbine or compressor rotor or wheel without employing grooves or drilling holes in the wheel itself. The spacers are installed in the normal fashion and, when final balancing is performed, appropriate weights are inserted into the slots in selected ones of the spacers. Fine tuning can be performed by drilling or grinding the weights. In one embodiment, the spacer is provided with a radial hole which joins an axial hole. After the turbine or compressor rotor is assembled, additional counterweight material can be added through the radial hole and then be held in place by suitable means such as a setscrew. In this embodiment, weights of suitable material can also be removed as necessary.

21 Claims, 2 Drawing Figures

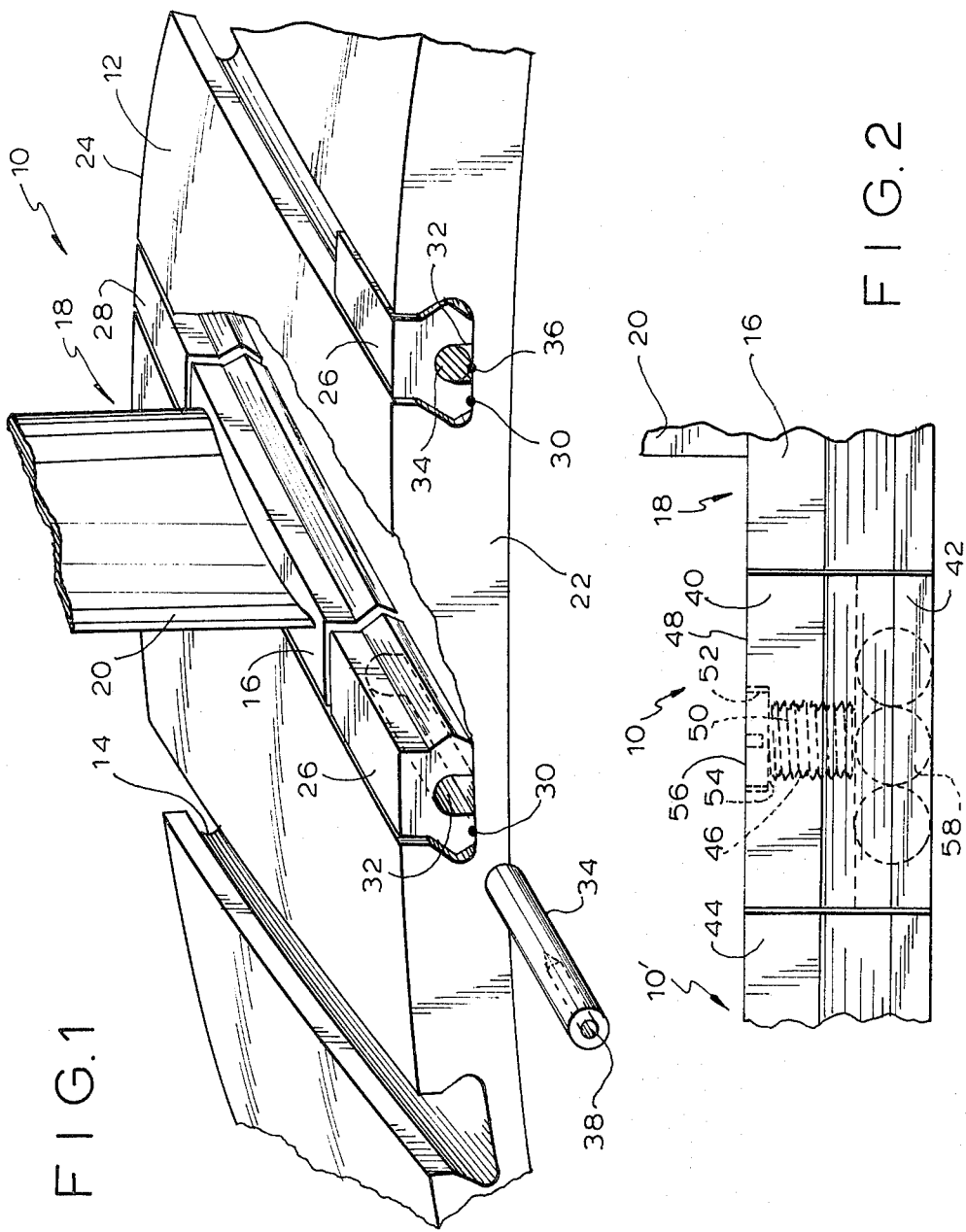

BALANCE FOR ROTATING MEMBER

BACKGROUND OF THE INVENTION

The present invention relates to rotors for axial flow compressors or turbines and, more particular, relates to means for balancing such rotors.

Precise balance of rotors in large steam and gas turbines is important for smooth operation. Balance is achieved by either adding material to, or removing material from, selected regions of the rotor.

In one conventional technique, weight is added in balance grooves formed in the side of the wheel. Balance grooves require thicker wheel profiles and increased wheel weight. Adding weight is undesirable in larger machines because of the possible adverse effect this may have on critical speed values. In addition, balance grooves add stress concentrations which become more undesirable as equipment progresses to more advanced and more highly stressed designs.

In another conventional technique, material is selectably removed by drilling balance holes between bolt holes in compressor and turbine rotors. In addition to the resulting stress concentrations, such balance holes might upset surface conditions and introduce asymmetry to the rotor, particularly in the clamping face area, where the faces must meet with a concentricity on the order of 0.0005 inches.

OBJECTS AND SUMMARY OF THE INVENTION

Accordingly, it is an object of the present invention to provide a balancing apparatus for a compressor and turbine disc which overcomes the drawbacks of the prior art.

More particularly, it is an object of the present invention to provide apparatus for balancing compressor and turbine discs which employs slots in conventional blade spacers for accepting balance weights. The balance weights include provision for fine tuning of balance by permitting the boring of trimming holes, or grinding them to a desired weight.

According to an embodiment of the invention, there is provided apparatus for balancing a rotating component of the type having a wheel and a plurality of blade members extending from the wheel, each of the blade members including a dovetail fittable into a dovetail slot in a perimeter of the wheel for support of the blade member, comprising the dovetail slot having a length exceeding a length of the dovetail, at least one spacer fittable into the dovetail slot abutting the dovetail and effective to retain the dovetail in a predetermined longitudinal position in the dovetail slot, a balance slot in the spacer, the balance slot being disposed to retain sufficient strength in the spacer to permit the spacer to resist inertial forces thereon, a balance weight fittable into the balance slot, and means for retaining the balance weight in the balance slot.

According to a feature of the invention, there is provided a rotating component comprising a rotatable wheel, a plurality of dovetail slots in a perimeter of the wheel, a plurality of blade members, each of the blade members including a dovetail fittable into one of the dovetail slots for support of the blade member, a length of the dovetail slot exceeding a length of the dovetail, at least one spacer fittable into the dovetail slot abutting the dovetail and effective to retain the dovetail in a predetermined position in the dovetail slot, a balance slot axially disposed in a radially inward surface of the spacer, the balance slot having a U-shaped cross section with an opening of the U-shaped cross section facing radially inward, a cylindrical balance weight fittable into the balance slot with a radius of the balance weight being substantially equal to a radius of a closed end of the U-shaped cross section, and means for rotating the balance weight in the balance slot.

According to a further feature of the invention, there is provided, a rotating component comprising, a rotatable wheel, a plurality of dovetail slots in a perimeter of the wheel, a plurality of blade members, each of the blade members including a dovetail fittable into one of the dovetail slots for support of the blade member, a length of the dovetail slot exceeding a length of the dovetail, at least one spacer fittable into the dovetail slot abutting the dovetail and effective to retain the dovetail in a predetermined position in the dovetail slot, a balance slot disposed in the spacer, a radial hole from a radially outward surface of the spacer communicating with the balance slot, and the balance weight being fittable through the radial hole thereby retaining the balance weight in the balance slot.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a perspective view of a portion of a turbine or compressor disc employing balancing apparatus according to an embodiment of the present invention.

FIG. 2 is a detailed side view of a portion of two adjacent compressor states showing an embodiment of the invention which permits the radial insertion of balance weights after assembly of the adjacent stages.

DETAILED DESCRIPTION OF THE PREFERRED EMBODIMENT

Although the present invention may have general application to both turbine discs and compressor discs, particularly for gas or steam turbines, the following embodiment is directed toward a compressor stage of a gas or steam turbine for concreteness of description.

A compressor stage is conventionally fabricated with a disc or wheel affixed or integrally formed with an axial shaft. Female dovetail regions are machined into the surface of the wheel and male dovetail regions of compressor blades are fitted into the female dovetails. In order to accurately position and retain each blade in its final position, it is conventional to employ one or both of an upstream and a downstream spacer which fits into the female dovetail and abuts the ends of the blade dovetail. Conventional spacers are of solid material.

Referring now to FIG. 1, a partially assembled compressor stage, shown generally at 10, includes a compressor wheel 12 having a plurality of generally parallel dovetail slots 14 machined therein. Each dovetail slot 14 receives a dovetail 16 of a compressor blade 18 for supporting an aerodynamic portion 20 of compressor blade 18 in an air stream which compressor stage 10 further compresses.

It will be noted that compressor blade 18 is positioned intermediate an upstream end 22 and a downstream end 24 of compressor wheel 12. In order to retain compressor blade 18 in its appropriate axial position, an upstream spacer 26 and a downstream spacer 28 are fitted into dovetail 16. Upstream spacer 26 is fixed in position by any conventional means such as by staking 30. Downstream spacer 28 is similarly affixed in position so that the upstream and downstream ends of dovetail 16 are tightly constrained by spacers 26 and 28.

A balance slot 32 is formed in the radially inner portion of upstream spacer 26 as well as in downstream spacer 28 (not shown in FIG. 1). A balance weight 34 is selectively insertable into balance slot 32 and may be secured therein by any convenient means such as, for example, by staking 36. Fine balance trimming may be performed by drilling a trimming hole 38 into balance weight 34. Trimming hole 38 is shown drilled axially in balance weight 34, however, this should not be considered limiting since other methods of reducing the mass of balance weight 34 may be employed. For example, the end or an intermediate portion of balance weight 34 may be ground or otherwise removed to reduce its mass. In addition, one or more radial holes (not shown) may be drilled through balance weight 34.

In the embodiment of spacers 26 and 28 of FIG. 1, balance slot 32 is mousehole or U-shaped with the opening of the U facing radially inward. The radially outward extent of balance slot 32 must be sufficiently limited so that the remaining material of spacers 26 and 28 is sufficient to give the parts adequate stiffness and strength to resist centrifugal force thereon during high speed operation of compressor stage 10. For this reason, the open-mouthed shape of balance slot 32 is placed as far radially inward as is possible. In addition, it should be noted that balance weight 34 is cylindrical and is in close mechanical contact with balance slot 32 at only a semi-circular portion of its surface. Other shapes of balance slot 32 and balance weight 34 are possible, as will be described, however, the use of a simple cylindrical rod for balance weight 34 and an easily machined U-shaped balance slot 32 reduces the cost of production.

In order to increase the strength of spacers 26 and 28, the radially outward contour of balance slot 32 may be changed from semi-cylindrical to an ellipsoidal shape with appropriate change in the shape of balance weight 34. Since such an embodiment would be perfectly evident to one skilled in the art given the disclosure herein, it is not illustrated or further described. In addition, other shapes of hole and weight may be employed for manufacturing convenience or other reasons. For example, a square hole and a square weight may be desired for ease of assembly.

It will be realized that not all balance slots 32 will receive balance weights 34 in an assembled balanced compressor stage. All spacers 26 and 28 may contain balance slots and a few of such slots, for example four slots, may receive balance weights 34. In addition, not all balance weights 34 may require trimming holes 38. That is, if two pairs of balance weights are disposed at selected positions around the perimeter of compressor wheel 12, trimming holes 38 may be required in only one, two, or three of a larger number of balance weights 34 to accomplish final balance.

As is well known, it is common to employ two or more turbine or compressor stages on a common shaft to extract more power from the working fluid. In the case of compressors, sixteen or more successive stages may be employed. When such stages are assembled together, they generally are in close axial abutment and further access to balance slots 32 and balance weights 34 is unavailable. Thus, the embodiment in the preceding paragraphs requires completion of balancing of each compressor stage 10 before final assembly and installation.

Referring now to the embodiment of the invention in FIG. 2, provision is made for final balancing even after assembly operations have made the ends of upstream and downstream spacers inaccessible. In this embodiment, an upstream spacer 40 abuts and constrains an end of dovetail 16 of compressor blade 18. A balance slot 42, which may have the same or different shape from balance slot 32 in the previous embodiment is disposed in a radially inward portion of upstream spacer 40. A downstream spacer 44 of the adjacent compressor stage 10' is made without a balance slot therein. Thus, balance slot 42 is terminated at each end by the lack of corresponding slots in the adjacent parts.

A radial hole 46, extending from a radially outward surface 48 of upstream spacer 40, communicates with balance slot 42. A closing member such as, for example, a setscrew 50, closes radial hole 46. Preferably, setscrew 50 includes a radially outward directed flange 52 which mates with a shoulder 54 of a counterbore in radial hole 46. An outer surface 56 of setscrew 50 is positioned flush with radially outward surface 48 of upstream spacer 40 when setscrew 50 is fully seated in radial hole 46.

Balance weights 58, which may be, for example, spherical steel balls, may be inserted into balance slot 42 by removing setscrew 50 and then retained therein by returning setscrew 50 into position. As indicated, more than one balance weight 58 may be employed as required to achieve proper balance.

This embodiment of the invention is particularly useful when an assembled compressor rotor of up to sixteen or more stages is found to require trim balance. The provision of a balance plane accessible from the exterior of the compressor rotor without having to the remove the compressor rotor from the machine is a significant improvement since it permits balance adjustment without requiring unstacking of compressor stages to place the balance correction in the proper location.

Appropriate selection of material for balance weight 58 may be employed so that, not only may balance be adjusted after assembly by adding additional balance weight 58, but also, balance weights 58 may be removed as required. To aid in the removal of balance weights 58, they may be made of magnetic material and a magnetic probe may be employed for their removal. It is also possible that balance weights 58 can be removed by rotating compressor stage 10 so that a radial hole is oriented downward rather than upward as shown.

In addition to steel balls, balance weights 58 may be of other types. For example, molten material of suitable properties may be poured through radial hole 46 and be retained therein after solidification.

Granular material may also be used. In addition, if balance weights 58 of a single dimension are employed, a range of different materials giving different weights per balance weight 58 may permit finer control of balance.

Although balance slots 32 and 42 are shown extending the full length of spacers 26 and 40, this should not be considered limiting. That is, particularly in the configuration of FIG. 2, a web (not shown) may be provided in one or both ends of spacer 40 to retain radially inserted balance weights 58 without complete dependence upon retention by abutment against adjacent dovetail elements which lack slots.

In some turbine or compressor stages, proper positioning of the blades may require the elimination of one or the other of the upstream or downstream spacers. That is, dovetail 16 (FIG. 1) may have its ends flush with upstream end 22 or downsteam end 24 of compressor wheel 12 and a single spacer may be employed at the opposite end of dovetail 16. A balance slot may be provided in the single spacer for use as previously described.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Apparatus for balancing a rotating component of the type having a wheel and a plurality of blade members extending from said wheel, each of said blade members including a dovetail fittable into a dovetail slot in a perimeter of said wheel for support of said blade member, comprising:
   said dovetail slot having a length exceeding a length of said dovetail;
   at least one spacer fittable into said dovetail slot abutting said dovetail and effective to retain said dovetail in a predetermind longitudinal position in said dovetail slot;
   a balance slot in said spacer;
   said balance slot being disposed to retain sufficient strength in said spacer to permit said spacer to resist inertial forces thereon;
   a balance weight fittable into said balance slot; and
   means for retaining said balance weight in said balance slot.

2. Apparatus according to claim 1 wherein said balance slot is axially disposed and includes a U-shaped cross section, an opening of said U-shaped cross section being disposed radially inward.

3. Apparatus according to claim 2 wherein said balance weight includes a cylindrical cross section, said cylindrical cross section and a curved portion of said U-shaped cross section having substantially equal radii.

4. Apparatus according to claim 1 wherein said means for retaining includes a staking at contiguous portions of said spacer and said wheel.

5. Apparatus according to claim 1 wherein said balance slot is axially disposed in said spacer and passes through opposed ends of said spacer.

6. Apparatus according to claim 1 wherein said means for retaining includes abutment of an end of said balance slot with a surface.

7. Apparatus according to claim 1 wherein said means for retaining includes a setscrew.

8. Apparatus according to claim 7 wherein said setscrew is radially disposed in said spacer.

9. Apparatus according to claim 1 further comprising a radial hole from a radially outward surface of said spacer communicating with said balance slot, said balance weight being fittable through said radial hole into said balance slot, said means for retaining including a setscrew effective for closing said radial hole whereby said balance weight is retained in said balance slot.

10. Apparatus according to claim 9 wherein said balance weight includes a selectable plurality of weights fittable within said balance slot, a variable number of said selectable plurality being employable for different balance conditions.

11. Apparatus according to claim 10 wherein said weights are balls.

12. Apparatus according to claim 9 wherein said balance weight includes granular material.

13. Apparatus according to claim 9 wherein said balance weight includes a meltable material solidified in place in said balance slot.

14. A rotating component comprising:
   a rotatable wheel;
   a plurality of dovetail slots in a perimeter of said wheel;
   a plurality of blade members;
   each of said blade members including a dovetail fittable into one of said dovetail slots for support of said blade member;
   a length of said dovetail slot exceeding a length of said dovetail;
   at least one spacer fittable into said dovetail slot abutting said dovetail and effective to retain said dovetail in a predetermined position in said dovetail slot;
   a balance slot axially disposed in a radially inward surface of said spacer;
   said balance slot having a U-shaped cross section with an opening of said U-shaped cross section facing radially inward;
   a cylindrical balance weight fittable into said balance slot with a radius of said balance weight being substantially equal to a radius of a closed end of said U-shaped cross section; and
   means for retaining said balance weight in said balance slot.

15. A rotating component according to claim 14 further comprising means for adjusting a weight of said balance weight.

16. A rotating component according to claim 15 wherein said means for adjusting a weight includes means for permitting drilling of a trimming hole in said balance weight.

17. A rotating component comprising;
   a rotatable wheel;
   a plurality of dovetail slots in a perimeter of said wheel;
   a plurality of blade members;
   each of said blade members including a dovetail fittable into one of said dovetail slots for support of said blade member;
   a length of said dovetail slot exceeding a length of said dovetail;
   at least one spacer fittable into said dovetail slot abutting said dovetail and effective to retain said dovetail in a predetermined position in said dovetail slot;
   a balance slot disposed in said spacer;
   a radial hole from a radially outward surface of said spacer communicating with said balance slot; and
   said balance weight being fittable through said radial hole thereby retaining said balance weight in said balance slot.

18. Apparatus according to claim 17 wherein said balance weight includes a selectable plurality of weights fittable within said balance slot, a variable number of said selectable plurality being employable for different balance conditions.

19. Apparatus according to claim 18 wherein said weights are balls.

20. Apparatus according to claim 19 wherein said balance weight includes granular material.

21. Apparatus according to claim 19 wherein said balance weight includes a meltable material solidified in place in said balance slot.

* * * * *